US012158388B2

(12) United States Patent
Yelle et al.

(10) Patent No.: US 12,158,388 B2
(45) Date of Patent: Dec. 3, 2024

(54) CALIBRATION ADAPTOR BRACKET, APPARATUS AND METHOD

(71) Applicant: CAE Inc., Saint-Laurent (CA)

(72) Inventors: Jean-Claude Yelle, Saint-Laurent (CA); Samuel Brisson, Saint-Laurent (CA); Zachary Planté, Saint-Laurent (CA)

(73) Assignee: CAE INC., Saint-Laurent (CA)

( * ) Notice: Subject to any disclaimer, the term of this patent is extended or adjusted under 35 U.S.C. 154(b) by 687 days.

(21) Appl. No.: 17/217,063

(22) Filed: Mar. 30, 2021

(65) Prior Publication Data

US 2022/0316970 A1     Oct. 6, 2022

(51) Int. Cl.
| | | |
|---|---|---|
| *G01L 5/22* | (2006.01) | |
| *B64C 13/04* | (2006.01) | |
| *B64F 5/60* | (2017.01) | |
| *F16M 13/02* | (2006.01) | |
| *G05G 9/047* | (2006.01) | |

(52) U.S. Cl.
CPC .......... *G01L 5/223* (2013.01); *B64C 13/0421* (2018.01); *B64C 13/0427* (2018.01); *B64F 5/60* (2017.01); *F16M 13/02* (2013.01); *G05G 9/047* (2013.01); *G05G 2009/04774* (2013.01)

(58) Field of Classification Search
CPC . G01L 5/223; B64C 13/0421; B64C 13/0427; B64F 5/60; F16M 13/02; G05G 9/047; G05G 2009/04774
See application file for complete search history.

(56) References Cited

U.S. PATENT DOCUMENTS

| | | | |
|---|---|---|---|
| 5,630,756 A * | 5/1997 | Thurston | G05G 9/047 |
| | | | 345/161 |
| 5,735,490 A | 4/1998 | Berthet et al. | |
| 2011/0048153 A1 | 3/2011 | Standke | |
| 2013/0068037 A1* | 3/2013 | Siklos | G01L 5/1627 |
| | | | 73/862.045 |

(Continued)

FOREIGN PATENT DOCUMENTS

| | | | |
|---|---|---|---|
| DE | 19926784 A1 * | 12/2000 | ....... A63B 21/00181 |
| WO | WO-2020027906 A1 * | 2/2020 | ........... A63F 13/218 |

OTHER PUBLICATIONS

Daruwalla-Calibration_of_a_force_feedback_joystick-Sidwell_Friends_School-March_2002 (Year: 2002).*

(Continued)

*Primary Examiner* — Ryan D Walsh
(74) *Attorney, Agent, or Firm* — LAVERY, DE BILLY, LLP; Hugh Mansfield

(57) ABSTRACT

Adaptors for positioning a force gauge relative to a control interface in a flight simulator or aircraft are disclosed where the control interface is moveable in at least one of a back-and-forth direction and a side-to-side direction. In some embodiments the adaptor comprises a housing positionable adjacent the control interface where the housing comprises a first surface configured to snugly receive a predetermined surface of the control interface and a second surface comprising a first housing connector configured for connection to the gauge connector such that pressure is exertable on the control interface by the force gauge in a first direction of measurement aligned with one of the back-and-forth direction and the side-to-side direction.

23 Claims, 12 Drawing Sheets

(56) References Cited

U.S. PATENT DOCUMENTS

2013/0256463 A1* 10/2013 Antraygue .......... B64C 13/0421
 244/234
2014/0214273 A1 7/2014 Smith et al.
2015/0330847 A1* 11/2015 McNeilly ................ G01L 1/246
 73/800
2018/0105407 A1* 4/2018 Porter ................ B66F 9/07568

OTHER PUBLICATIONS

DE-19926784-A1 English Translation (Year: 2000).*
WO-2020027906-A1 English Translation (Year: 2020).*

* cited by examiner

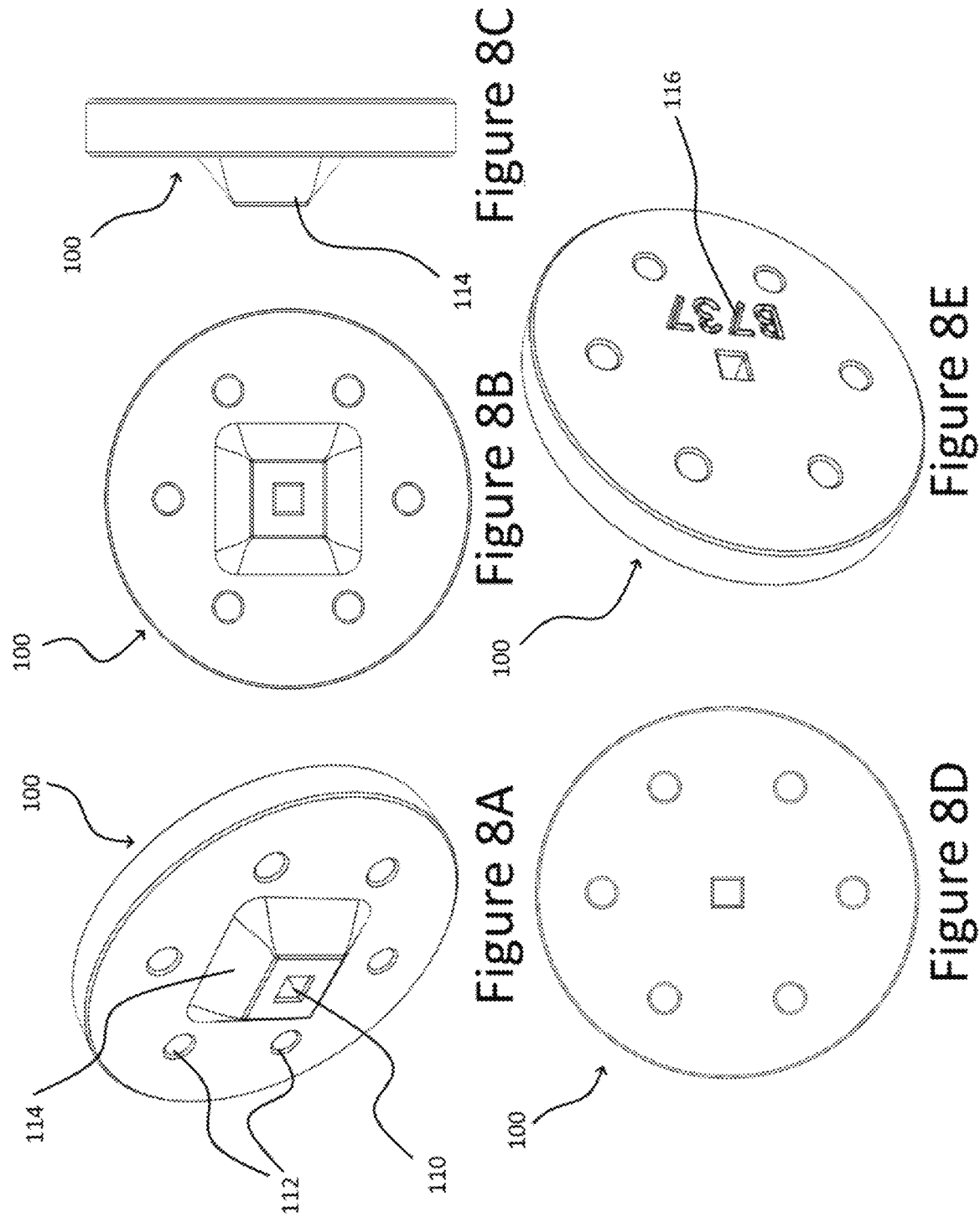

CALIBRATION ADAPTOR BRACKET, APPARATUS AND METHOD

FIELD OF THE INVENTION

The present invention relates to a calibration adaptor bracket, apparatus and method. In particular, the present application relates to adaptors for connecting a force gauge to a control interface such as a yoke, stick, sidestick, rudder pedal or stab trim, in particular for use in a flight simulator or aircraft, and an apparatus and method for calibrating a simulated control interface such as a yoke, stick, sidestick, rudder pedal or stab trim in a flight simulator or aircraft.

BACKGROUND TO THE INVENTION

Vehicle simulators such as those for simulating the operation of an aircraft have been developed to provide a realistic analogue of the vehicle being simulated without the dangers inherent in having such a vehicle operated by a novice or under extreme conditions. As the realism of the simulators has improved, they have become an indispensable component in the certification of vehicle operators such as pilots. In order to ensure that a given simulator meets the requisite realism such that they can be used as part of a certification program, the operation of various components must be measured versus a preapproved certification standard and, as necessary, the components must be recalibrated. In particular, systems such as sidesticks and stab trims, which provide an instantaneous force feedback to the operator where the amount of force is an indication of the current state of a component of the vehicle being operated (such as the flaps, ailerons and elevators on an aircraft) are required to provide a simulated force feedback that reproduces the levels of force feedback as would be experienced by the operator during actual operation.

Methods for measuring the force feedback of a sidestick and stab trim during operation of the simulator are known in the art. One drawback of these methods is that the measurements are not readily reproducible from time to time and simulator to simulator.

SUMMARY OF THE INVENTION

In order to address the above and other drawbacks, there is provided an adaptor for positioning a force gauge relative to a control interface in a flight simulator or aircraft. The force gauge comprises a gauge handle and a gauge connector, the control interface being moveable in at least one of a back-and-forth direction and a side-to-side direction, the adaptor comprising a housing positionable adjacent the control interface, said housing comprising a first surface configured to snugly receive a predetermined surface of the control interface, and a second surface comprising a first housing connector configured for connection to the gauge connector such that pressure is exertable on the control interface by the force gauge in a first direction of measurement aligned with at least one of the back-and-forth direction and the side-to-side direction.

There is also provided a kit for measuring a force feedback of a control interface in a flight simulator or aircraft, the control interface moveable in a back-and-forth direction to change one of a pitch and a yaw of the simulator and in a side-to-side direction to change a roll of the simulator. The kit comprises a force gauge comprising a gauge handle, a gauge attachment portion and a first direction of measurement, and a housing positionable adjacent the control interface, the housing comprising a first inner surface configured to snugly receive a predetermined surface of the control interface and a second surface comprising a first point of attachment configured for attachment to the gauge attachment portion such that the first direction of measurement is aligned with one of the back-and-forth direction and the side-to-side direction.

Additionally, there is provided a method for testing a force feedback of a control interface in a flight simulator, the control interface being moveable in at least one of a back-and-forth direction to change a pitch or a yaw of the simulator and in a side-to-side direction to change a roll of the simulator. The method comprises placing an adaptor comprising a first point of attachment adjacent the control interface, connecting a force gauge to the first point of attachment such that a first direction of measurement of the force gauge is aligned with one of the back-and-forth direction and the side-to-side direction, and moving a gauge handle portion of the force gauge in the first direction of measurement, thereby causing the force gauge to measure the force feedback generated by the control interface in the first measurement direction.

Furthermore, there is provided an assembly for measuring a force feedback of a stab trim in a flight simulator or aircraft, the stab trim comprising a trim wheel comprising a shaft receiving aperture arranged along an axis of the trim wheel. The assembly comprises an elongate shaft configured for insertion into the aperture and comprising a shaft axis, a handle arranged substantially radially to the shaft axis, and a load cell interconnecting the shaft and the handle wherein the load cell is configured for measuring a torque between the handle and the shaft.

Also, there is provided a method of testing a stab trim in a cockpit simulator or aircraft, the stab trim comprising a trim wheel comprising a shaft receiving aperture arranged along an axis thereof. The method comprises interconnecting a shaft to a handle wherein the shaft comprises a shaft axis and the handle is arranged substantially radially to the shaft axis, inserting the shaft into the aperture, operating the simulator, and measuring a torque between the handle and the shaft.

BRIEF DESCRIPTION OF THE DRAWINGS

FIG. 8A provides a raised right front perspective view of an adaptor bracket in accordance with an illustrative embodiment of the present invention;

FIG. 8B provides a front plan view of an adaptor bracket in accordance with an illustrative embodiment of the present invention.

FIG. 8C provides a side plan view of an adaptor bracket in accordance with an illustrative embodiment of the present invention.

FIG. 8D provides a rear plan view of an adaptor bracket in accordance with an illustrative embodiment of the present invention.

FIG. 8E provides a raised left rear perspective view of an adaptor bracket in accordance with an illustrative embodiment of the present invention.

DETAILED DESCRIPTION OF THE ILLUSTRATIVE EMBODIMENTS

Figure 1A:
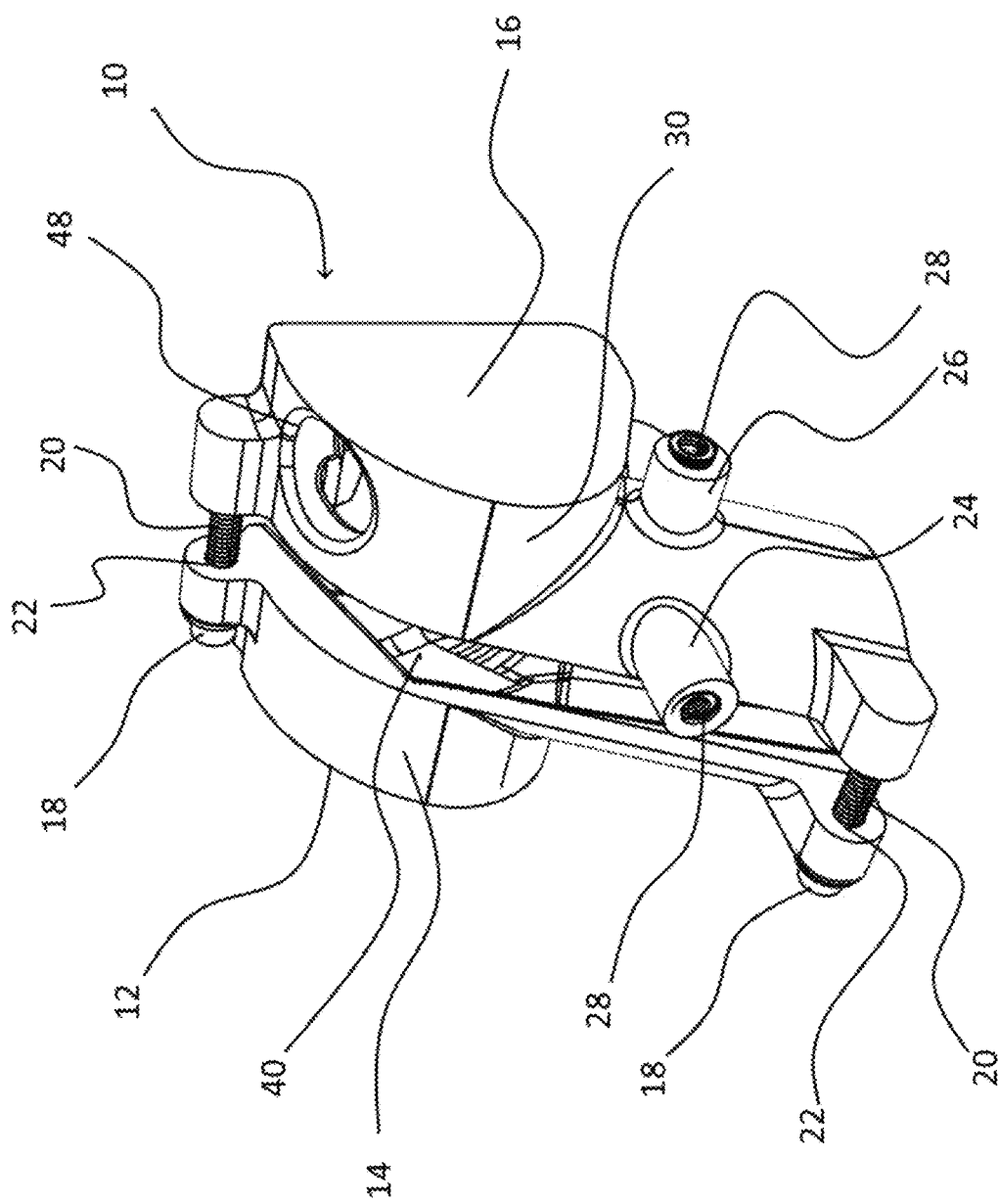
FIG. 1A provides a rear right raised perspective view of an adaptor bracket in accordance with a first illustrative embodiment of the present invention.
Figure 1D:
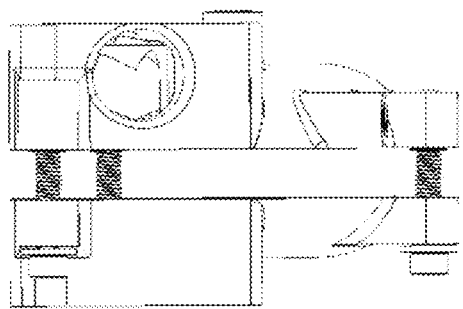
FIG. 1D provides a top plan view of an adaptor bracket in accordance with a first illustrative embodiment of the present invention.
Figure 1C:
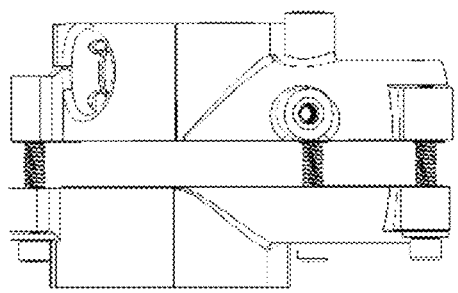
FIG. 1C provides a rear plan view of an adaptor bracket in accordance with a first illustrative embodiment of the present invention.
Figure 1B:
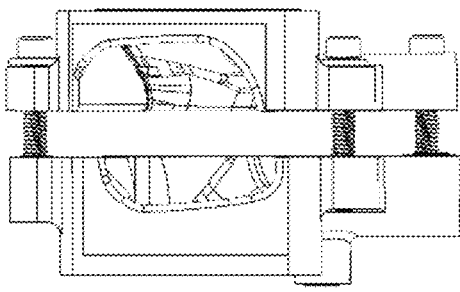
FIG. 1B provides a front plan view of an adaptor bracket in accordance with a first illustrative embodiment of the present invention.
Figure 1G:
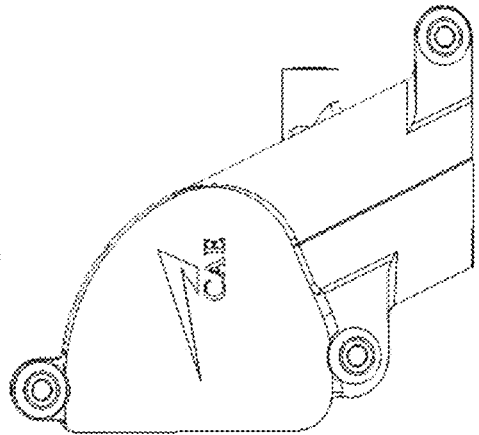
FIG. 1G provides a left plan view of an adaptor bracket in accordance with a first illustrative embodiment of the present invention.
Figure 1F:
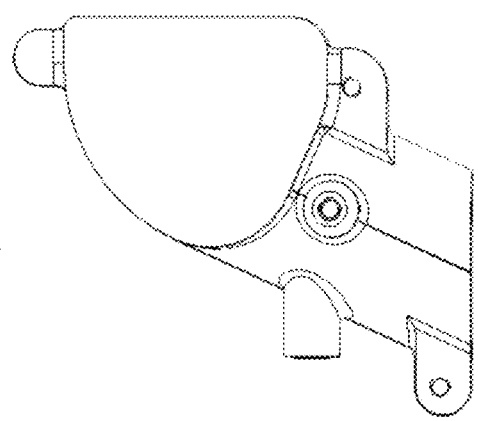
FIG. 1F provides a right plan view of an adaptor bracket in accordance with a first illustrative embodiment of the present invention.
Figure 1E:
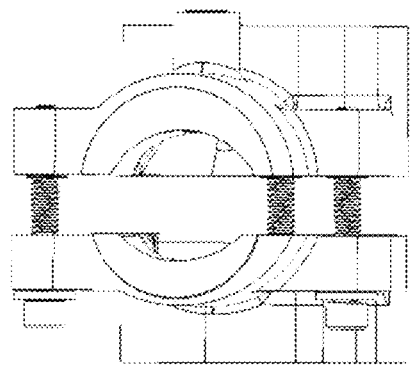
FIG. 1E provides a bottom plan view of an adaptor bracket in accordance with a first illustrative embodiment of the present invention.

Referring now to FIG. 1A, a first embodiment of an adaptor, generally referred to using the reference numeral 10, will be described. The adaptor 10 comprises a housing 12 illustratively comprised of two complementary plastic parts or halves 14, 16. The first complementary half 14 and the second complementary half 16 may be assembled together using a plurality of fasteners 18. In a particular embodiment each of the fasteners 18 comprises a bolt 20 inserted through a respective bolt receiving bore 22 in a first of the complementary halves 14, 16 and threaded into a respective one of a plurality of threaded inserts (not shown) in a second one of the two complementary halves 14, 16.

Still referring to FIG. 1A, the housing 12 further comprises a first point of attachment 24 and a second point of attachment 26. Each point of attachment 24, 26 illustratively comprises a threaded receptacle 28.

Figure 2:
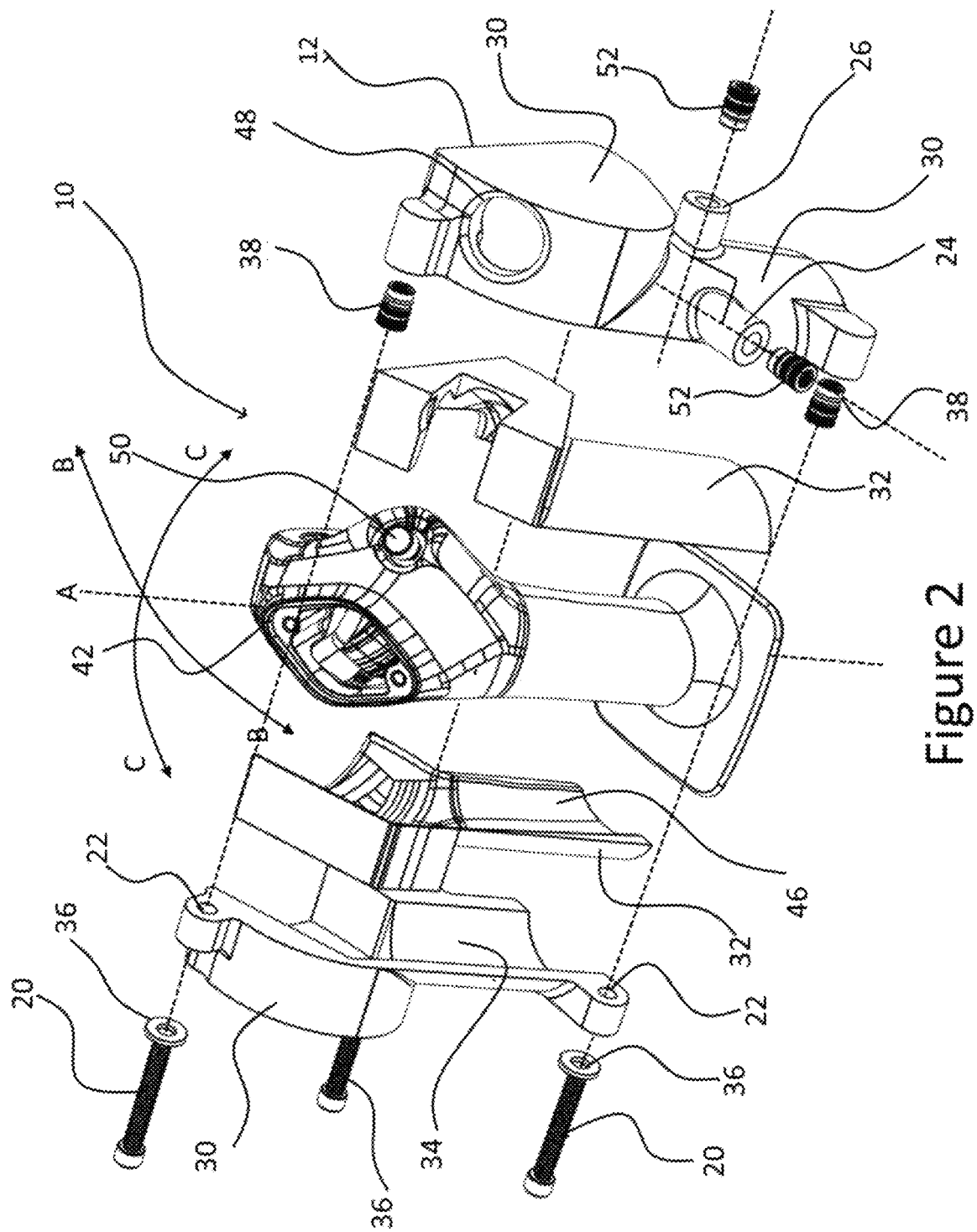
FIG. 2 provides an exploded perspective view of an adaptor bracket and sidestick assembly in accordance with a first illustrative embodiment of the present invention.

Referring now to FIG. 2 in addition to FIG. 1A, each of the complementary halves 14, 16 comprises an outer shell 30 manufactured from a rigid material such as hard plastic or the like, and a liner 32 manufactured from a flexible material such as a soft plastic or the like. The inner surface 34 of each of the outer shells 30 is formed to receive the liner 32 in a snug fit and such that the liner 32 is held snugly against the inner surface 34. In a particular embodiment an adhesive (not shown) may be used to secure the liner 32 to a corresponding one of the outer shells 30 or the liner 32 and a corresponding one of the outer shells 30 may be manufactured together as a unitary piece.

Still referring to FIG. 2 in addition to FIG. 1A, the liner 32 is formed such that when the complementary halves 14, 16 are assembled together by threading for each one of the fasteners 18 the bolt 20 into the bore 22 via a washer 36 and a threaded insert 38, a sidestick, or control interface, receiving space 40 is defined which is shaped to snugly receive a sidestick/control interface 42 such that the sidestick/control interface 42 is held securely within the sidestick receiving space 40 by the complementary halves 14, 16. In this regard, the liner 32 of each of the complementary halves 14, 16 includes features such as a molded surface 46 or the like which is complementary to the shape of the sidestick/control interface 42, and which ensures that each time the adaptor 10 is assembled about the sidestick/control interface 42, the positioning of the adaptor 10 on the sidestick/control interface 42 is consistently the same. Additionally, the complementary halves 14, 16 may further comprise apertures 48 or the like allowing control buttons 50 and the like on the sidestick/control interface 42 to be accessed.

Still referring to FIG. 2, as known in the art the sidestick/control interface 42 is moveable from a central axis A in both a back-and-forth (B-B) direction which for example controls the pitch of an aircraft (not shown) and a side-to-side (C-C) direction which for example controls the roll of the aircraft. The first point of attachment 24 and second point of attachment 26 are positioned on the outer shell 30 of the housing 12 such that when the complementary halves 14, 16 are assembled about the sidestick/control interface 42, the first point of attachment 24 is aligned with the back-and-forth (B-B) direction, and the second point of attachment 26 is aligned with the side-to-side (S-S) direction, the second point of attachment 26 being at right angles to the orientation of the first point of attachment 24. Additionally, the first point of attachment 24 and the second point of attachment 26 lie in the same plane, which is substantially normal to the axis A of the sidestick/control interface 42. In a particular embodiment, an accelerometer (not shown) can for example be embedded in the outer shell 30 or the like. An exemplary embodiment of an accelerometer comprises a PhidgetSpatial 3/3/3 Precision accelerometer/magnetometer/gyroscope.

Figure 3A:
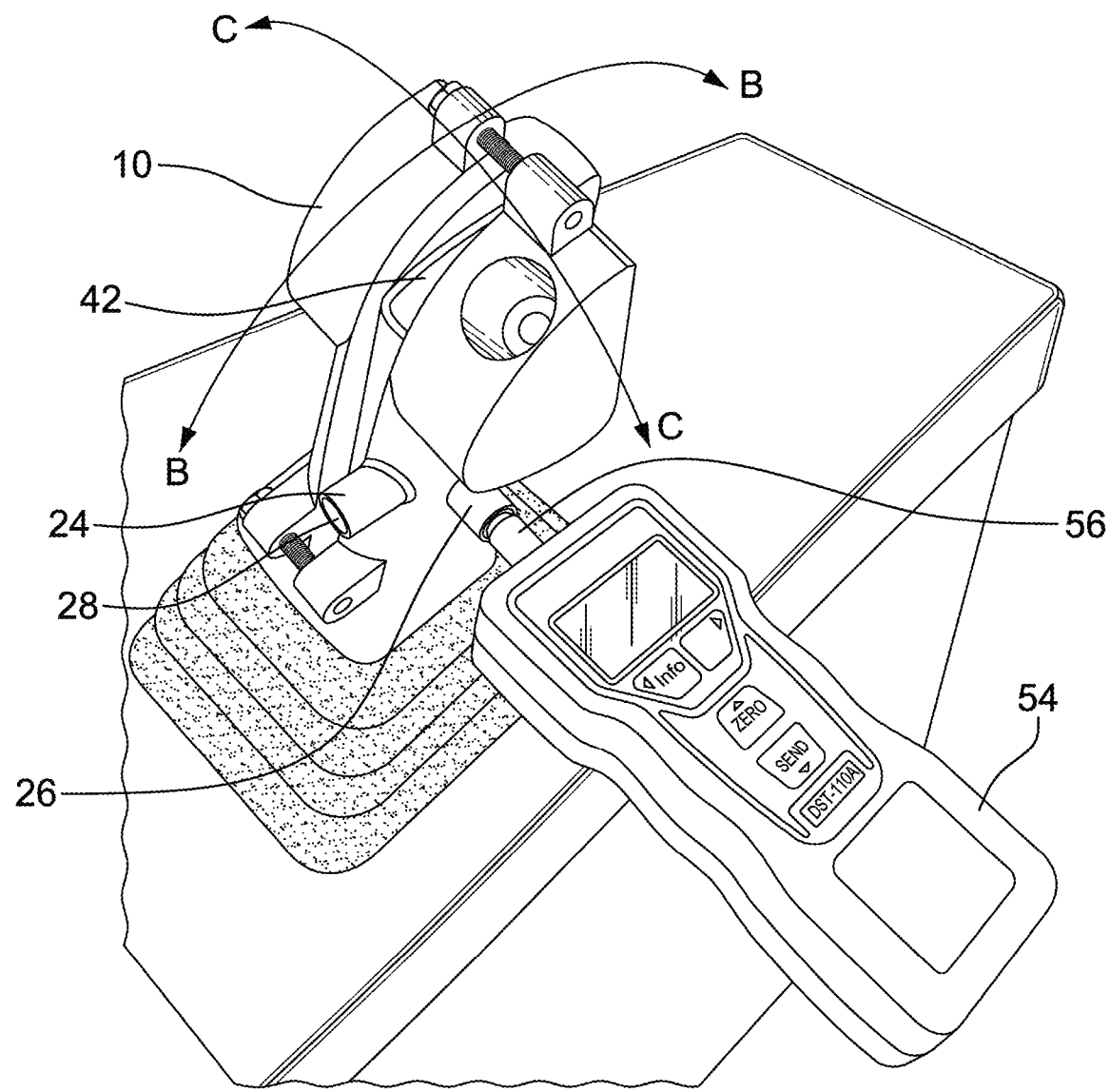
FIG. 3A provides a rear right raised perspective view of an adaptor bracket, sidestick and force gauge assembly for measuring force feedback in a side-to-side direction in accordance with a first illustrative embodiment of the present invention.
Figure 3B:
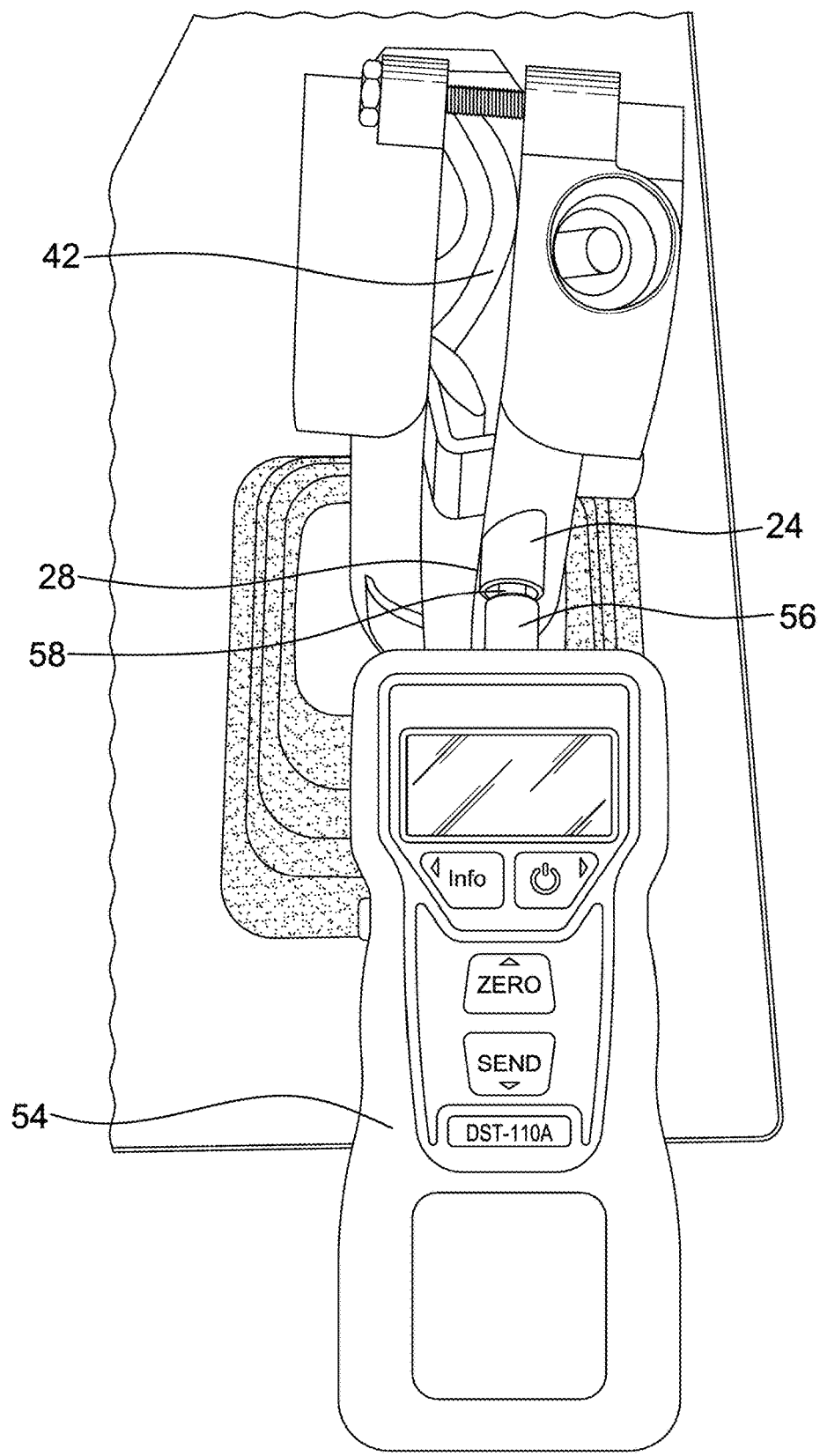
FIG. 3B provides a rear right raised perspective view of an adaptor bracket, sidestick and force gauge assembly for measuring force feedback in a back to front direction in accordance with a first illustrative embodiment of the present invention.

Referring now to FIG. 3A and FIG. 3B in addition to FIG. 2, as discussed above each of the first point of attachment 24 and the second point of attachment 26 comprises the threaded receptacle 28 (which illustratively comprises a threaded insert 52). In order to measure the force feedback, the sidestick/control interface 42 in the back and forth (B-B) direction or the side-to-side (C-C) direction, once the bracket 10 has been assembled to the sidestick/control interface 42, a force gauge 54 comprising a plunger 56 may be attached to the bracket 10 by threading a threaded end 58 of the plunger 56 into the threaded receptacle 28 of a respective one of the first point of attachment 24 and the second point of attachment 26. As known in the art, the plunger 56 moves back and forth along a plunger axis. During measurement of the force feedback, the angle of the sidestick/control interface 42 may be measured, for example by reading an output of an accelerometer or by reading the angle from a simulator output.

Referring still to FIG. 3A, the force feedback of the sidestick/control interface 42 in the side to side (C-C) direction, which is aligned with the plunger axis, can be measured by the force gauge 54 by threading the threaded end 58 of the plunger 56 into the threaded receptacle 28 of the second point of attachment 26 and pulling and pushing on the sidestick/control interface 42 in a side to side (C-C) direction using the force gauge 54 and such that pressure is exerted on the sidestick by movement of the force gauge 54. Movement of the sidestick/control interface 42 in a side-to-side direction is typically limited to a maximum deflection of about 20 degrees in either direction.

Referring back to FIG. 3B, the force feedback of the sidestick/control interface 42 in the back and forth (B-B) direction can be measured by the force gauge 54 by threading the threaded end 58 of the plunger 56 into the threaded receptacle 28 of the first point of attachment 24 and pulling and pushing on the sidestick/control interface 42 in a back and forth (B-B) direction using the force gauge 54. Movement of the sidestick/control interface 42 in a back-and-forth direction is typically limited to a maximum deflection of about 18 degrees in either direction.

Figure 4:
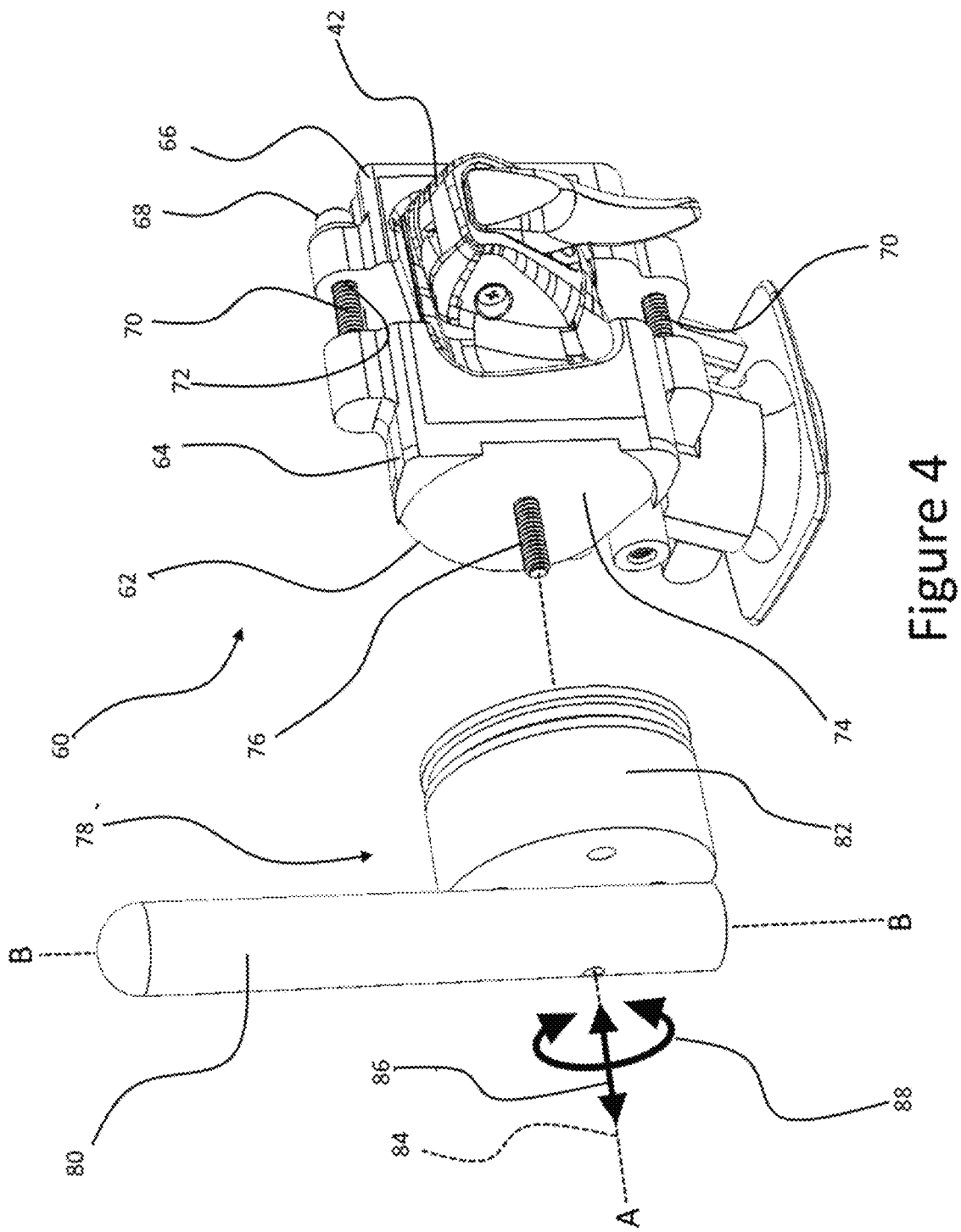
FIG. 4 provides a partially exploded perspective view of an adaptor bracket and sidestick assembly in accordance with a second illustrative embodiment of the present invention.

Referring now to FIG. 4, a second embodiment of an adaptor 60 will be described. The adaptor 60 comprises a housing 62 illustratively comprised of two complementary plastic parts or halves 64, 66. The first complementary half 64 and the second complementary half 66 may be assembled together using a plurality of fasteners 68. In a particular embodiment the fasteners each comprises a bolt 70 each of which is inserted through a respective bolt receiving bore 72 in a first of the complementary halves 64 and threaded into a respective one of a plurality of threaded inserts (not shown) in a second one of the two complementary halves 64, 66. The two complementary halves 64, 66 are securable about the sidestick/control interface 42, which is held snugly therebetween for movement therewith.

Still referring to FIG. 4, the housing 62 further comprises a first point of attachment 74 illustratively comprising a threaded rod 76. A force gauge 78 comprising a gauge handle 80 may be secured to the adaptor 60 via the rod 76. The force gauge 78 further comprises a sensor package 82 comprising one or more sensors (not shown) such as a load cell or the like which measure forces arising between the gauge handle 80 and the first point of attachment 74. An exemplary embodiment of a suitable load cell is a six (6) degree of freedom force-torque sensor which comprises strain gauges able to measure force along 3 orthogonal axes and produced by JR3 Multi-Axis Load Cell Systems. Illustratively, the sensor package 82 measures both axial forces and torque forces vis-à-vis axis A 84 of the point of attachment 74. The elongate gauge handle 80 is illustratively secured to the sensor package 82 such that the gauge handle axis B is at right angles to the axis A.

Still referring to FIG. 4, in operation with the force gauge 78 secured to the housing 62 via the point of attachment 74 and the threaded rod 76, movement by a user of the gauge handle 80 in either a back and forth or side-to-side direction imparts measurable forces on the sidestick/control interface 42 in respectively the back and forth or side-to-side directions. The sensor package 82 reads these imparted forces as axial 86 or torque 88 forces, which can be collected and analysed in order to calibrate the sidestick/control interface 42.

Figure 5:
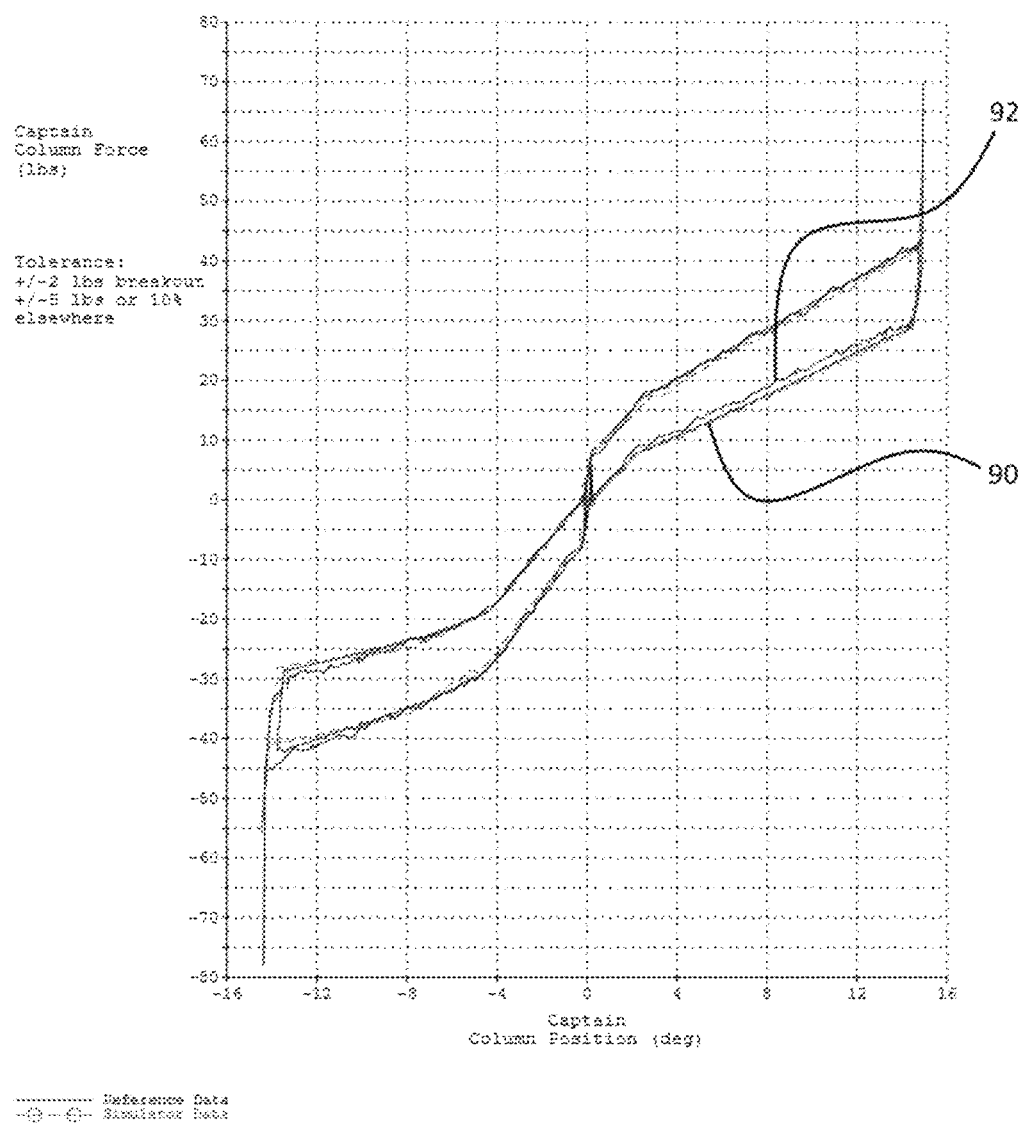
FIG. 5 provides a graph of results of a force measurement of a sidestick in accordance with an illustrative embodiment of the present invention.

Referring now to FIG. 5 in addition to FIG. 4, output data 90 of a force measurement versus angle from upright of a sidestick/control interface 42 in a back and front (fore and aft) movement is shown. Additionally, reference data 92 may also be provided.

Figure 6:
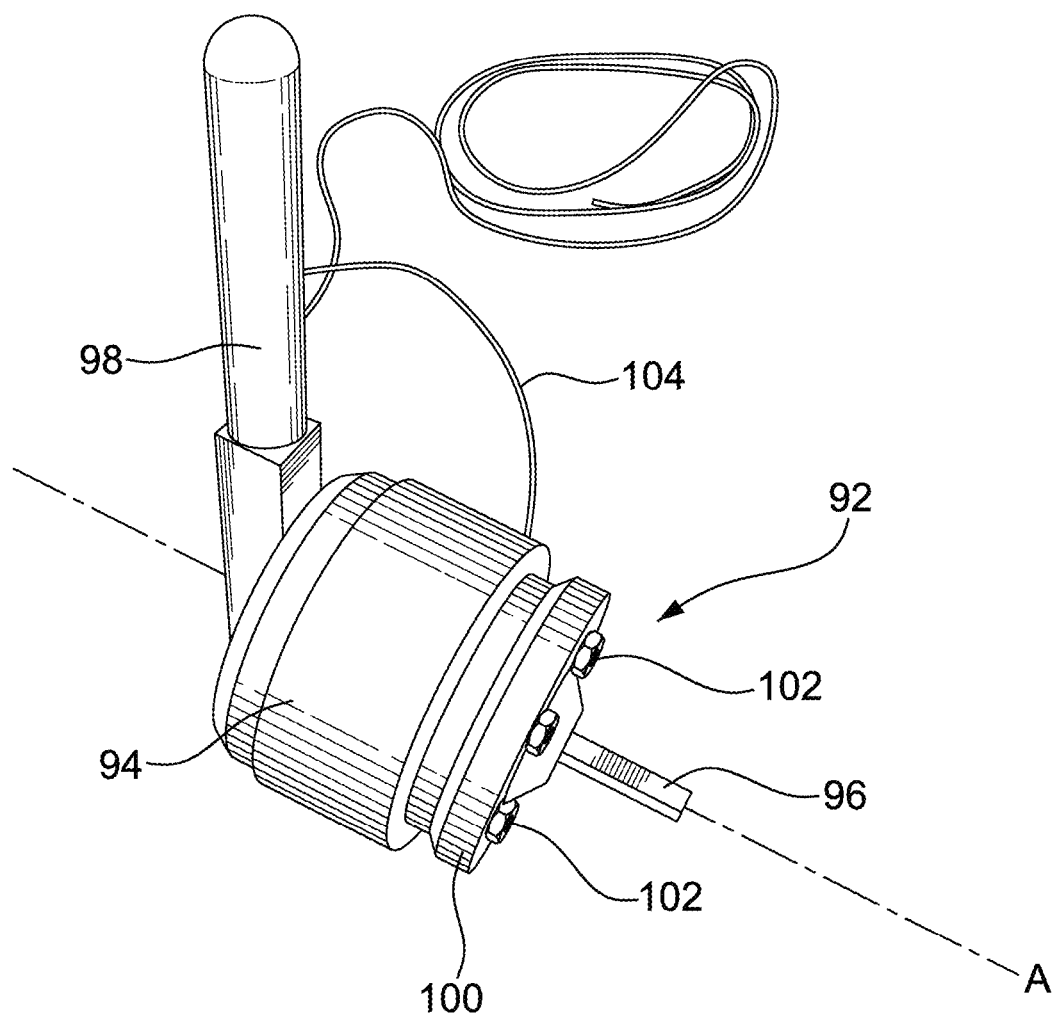
FIG. 6 provides a raised perspective view of an assembly for measuring torque in a stab trim in accordance with an illustrative embodiment of the present invention.

Referring now to FIG. 6, an assembly 92 for measuring the feedback force of a stab trim is disclosed. The assembly 92 comprises a load cell 94 for measuring the torque between an elongate shaft 96 comprising a shaft axis A and a handle 98 arranged radially to the shaft axis A. The shaft 96 is mounted to the load cell 94 by a disk-shaped bracket 100 and a plurality of fasteners such as bolts 102 or the like. A conductive wire 104 can be provided to interconnect the electronics (not shown) of the load cell 94 with an external measuring device (also not shown), such as a multi-meter or the like, and via which measured torque values can be read.

Figure 7:
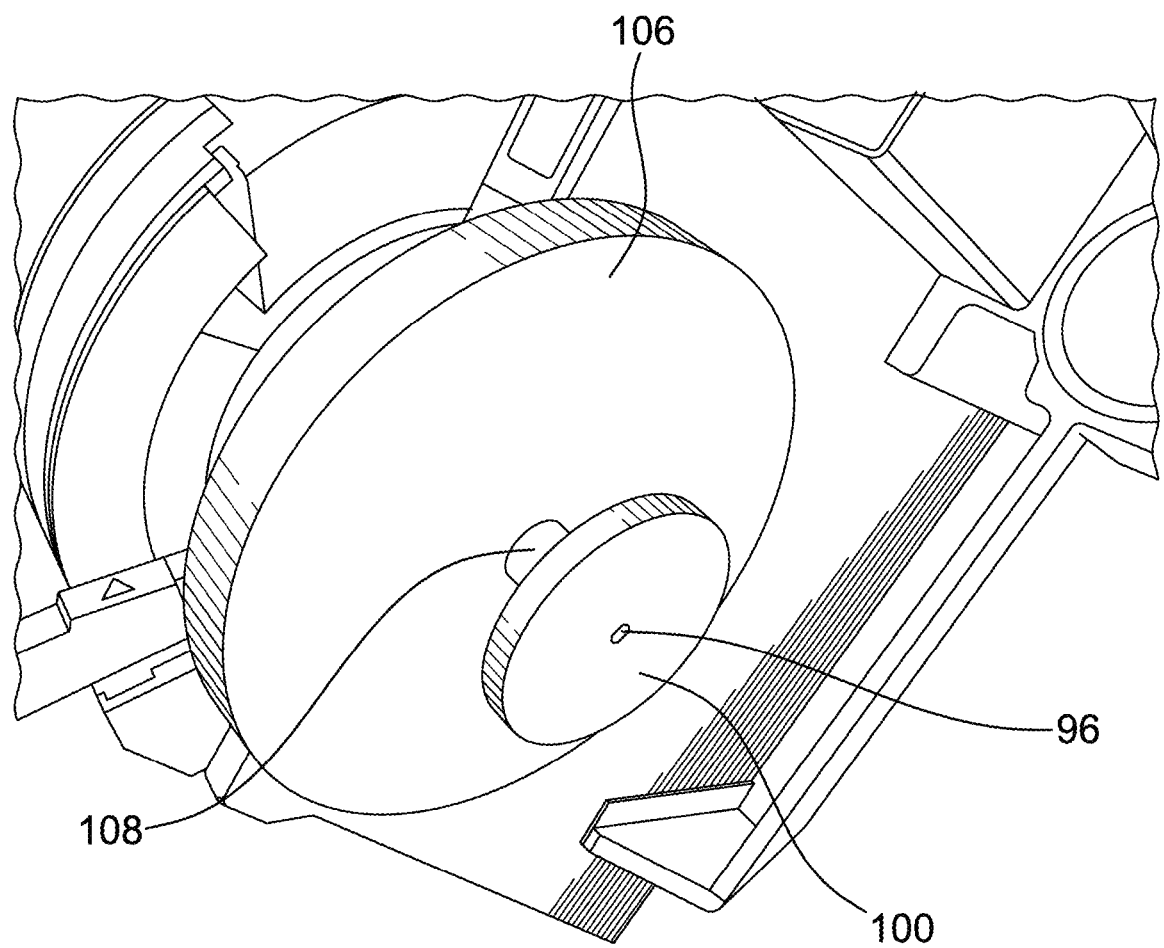
FIG. 7 provides a raised perspective view of a stab trim with a shaft and adaptor bracket installed in accordance with an illustrative embodiment of the present invention.

Referring now to FIG. 7, the shaft 96 is interconnectable with a stab trim 106, which comprises a stab trim aperture 108 into which the shaft 96 can be inserted. In this regard, the aperture 108 and the shaft 96 are complementary in shape such that when inserted, the shaft 96 rotates with the stab trim 106. Illustratively, the shaft 96 is manufactured from a square rod and comprises a square cross-section.

Referring to FIGS. 8A through 8F in addition to FIG. 6, the bracket 100 is sized to accord with the load cell 94 and comprises a shaft receiving aperture 110 for receiving the shaft 96 as well as a plurality of bores 112 via which the bolts 102 can be inserted. The shaft receiving aperture 110 is illustratively sized and shaped to accept the square shaft 96 in a friction fit and for rotation therewith. An embossment 114 is provided around the shaft receiving aperture 110 to ensure that, when the assembly 92 is mounted to a stab trim 106, a minimum spacing is maintained to ensure that the assembly 92 is only in contact with the stab trim via shaft 96.

With reference to FIG. 8F, in a particular embodiment a designation of the aircraft 116 for which the stab trim adaptor bracket 98 is intended can be provided.

Referring back to FIG. 6 and FIG. 7, in operation, the force feedback of the stab trim 106 can be measured by interconnecting the load cell 94 with a measuring device, inserting the shaft 96 of the assembly 92 into the stab trim aperture 108 and moving the handle 98 while collecting readings via the measurement device.

Figures 9A, 9B:
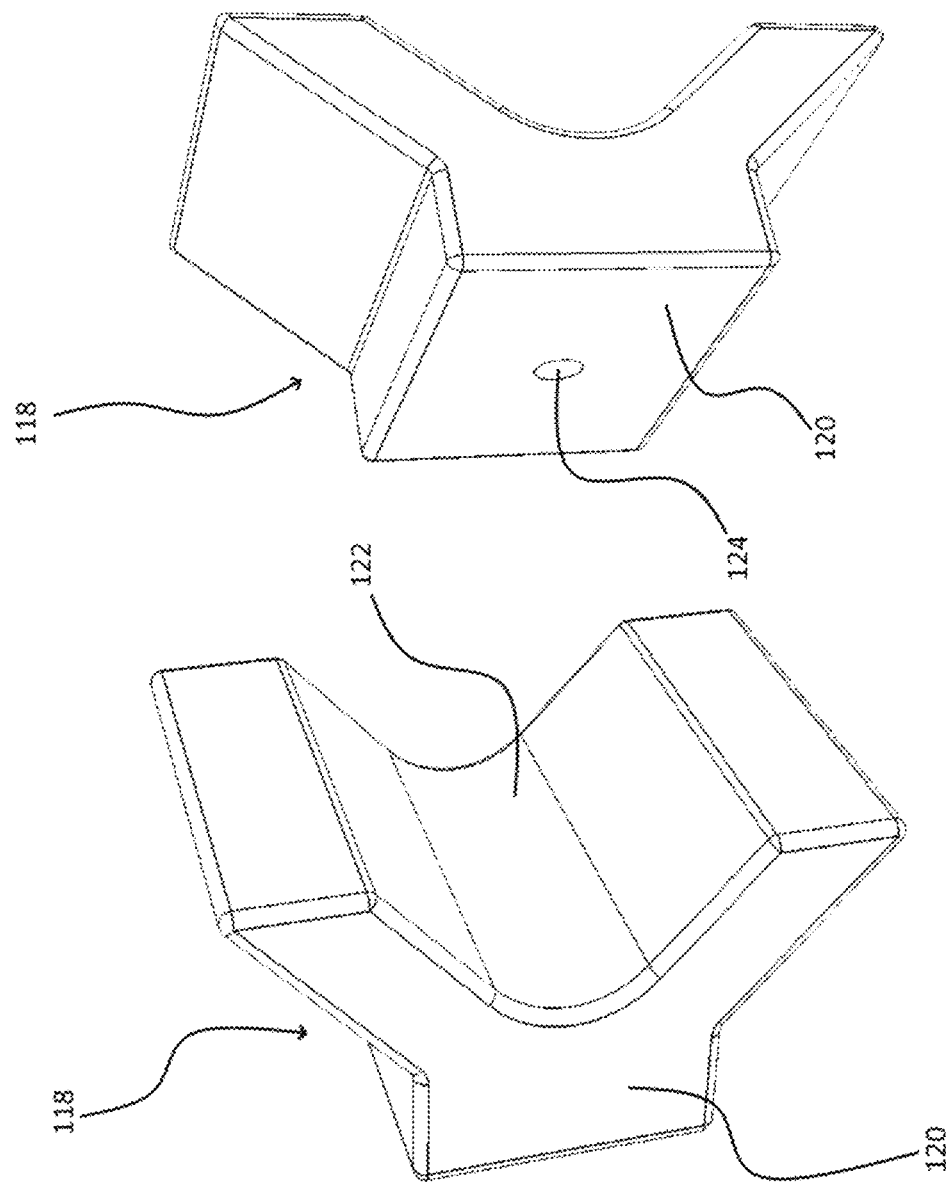
FIG. 9A provides a raised left front perspective view of an adaptor bracket in accordance with a third illustrative embodiment of the present invention.
FIG. 9B provides a right rear front perspective view of an adaptor bracket in accordance with a third illustrative embodiment of the present invention.

Referring now to FIG. 9A and FIG. 9B, an adaptor 118 in accordance with a third illustrative embodiment will now be described. The adaptor 118 comprises an adaptor body 120 comprising a foot pedal/control interface receiving recess 122. A point of attachment 124 is provided for attaching the plunger of a force gauge (both not shown). Illustratively the point of attachment 124 comprises an inner surface (not shown) threaded to receive a threaded end of the plunger.

Figure 10:
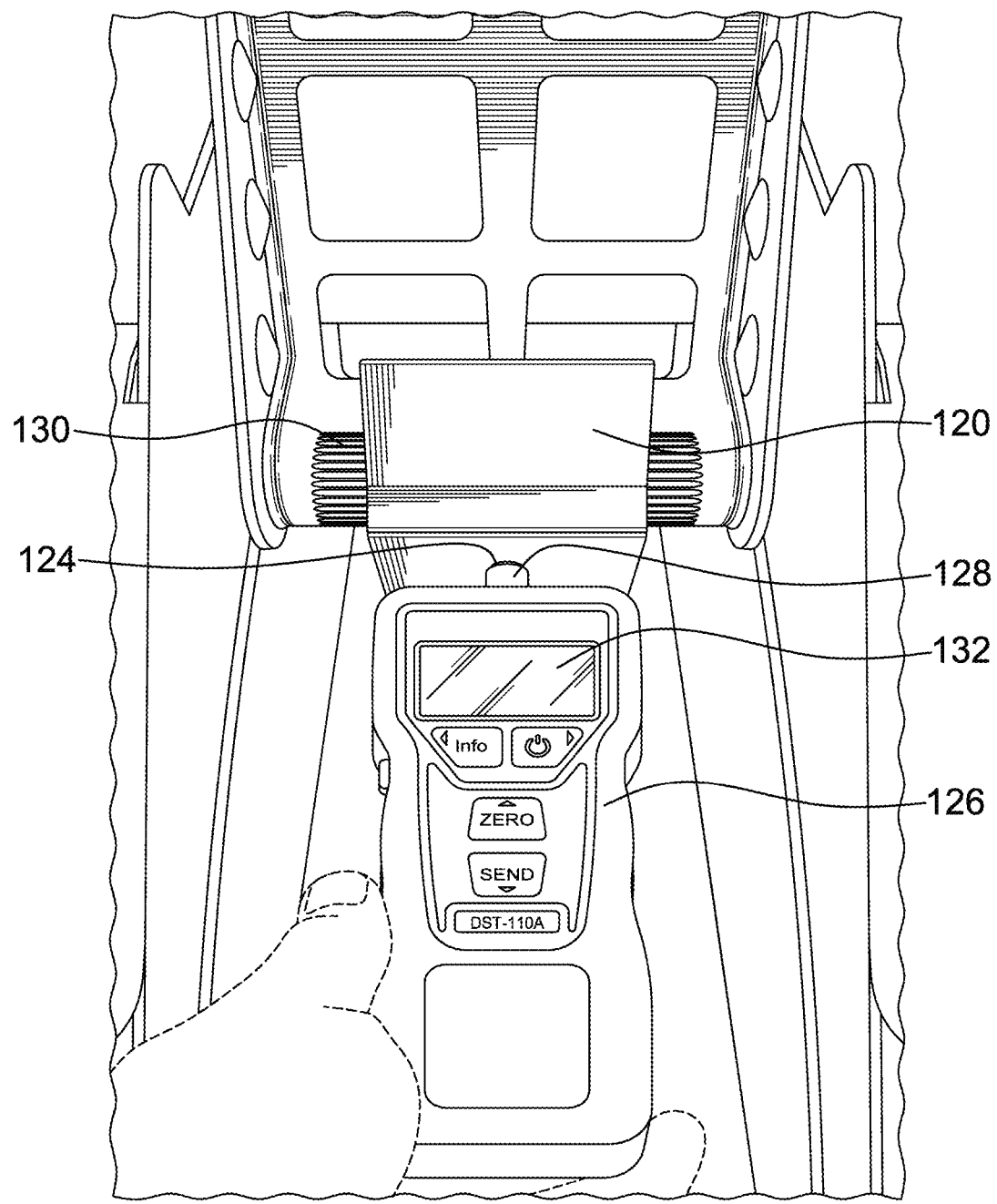
FIG. 10 provides a rear raised perspective view of an adaptor bracket, rudder pedal and force gauge assembly for measuring force feedback of a rudder pedal in accordance with a third illustrative embodiment of the present invention.

Referring now to FIG. 10, a force gauge 126 comprising a plunger 128 is secured to the adaptor 118 by threading the end of the plunger 128 into the point of attachment 124. Once assembled, the foot pedal receiving recess 122 is placed over and pressed against a pedal/control interface 130 being tested (illustratively a rudder pedal in an aircraft simulator). The measured result is read off the display 132 of the force gauge 126.

Although the present invention has been described hereinabove by way of specific embodiments thereof, it can be modified, without departing from the spirit and nature of the subject invention as defined in the appended claims.

The invention claimed is:

1. An adaptor for positioning a force gauge relative to a control interface in a flight simulator or aircraft, the force gauge comprising a gauge handle and a gauge connector, the control interface being moveable in at least one of a back-and-forth direction and a side-to-side direction, the adaptor comprising:
   a housing positionable adjacent a free end of the control interface, the housing comprising:
   a first surface configured to snugly receive a predetermined surface of the free end; and
   a second surface comprising a first housing connector configured for connection to the gauge connector such that pressure is exertable on the free end by the force gauge in a first direction of measurement aligned with one of the back-and-forth direction and the side-to-side direction.

2. The adaptor of claim 1, wherein the control interface comprises a sidestick and the free end comprises a hand grip and wherein the housing is securable about the handgrip.

3. The adaptor of claim 2, wherein a second direction of measurement is at right angles to the first direction of measurement, and a first point of attachment being configured such that the first direction of measurement is aligned with the back-and-forth direction and the second direction of measurement is aligned with the side-to-side direction.

4. The adaptor of claim 2, wherein the gauge connector comprises an elongate plunger, the first direction of measurement is aligned with a plunger axis, an outer surface comprises a second point of attachment, a first point of attachment is configured to receive an end of the plunger such that the plunger axis is aligned with the back-and-forth direction and the second point of attachment is configured to receive the end of the plunger such that the plunger axis is aligned with the side-to-side direction.

5. The adaptor of claim 4, wherein the first point of attachment is at right angles to the second point of attachment.

6. The adaptor of claim 4, wherein the first point of attachment and the second point of attachment lie in a common plane.

7. The adaptor of claim 6, wherein the common plane is substantially normal to the sidestick.

8. The adaptor of claim 4, wherein the plunger comprises a male threaded end and wherein the first point of attachment and the second point of attachment each comprise a female threaded receptacle for receiving the male threaded end.

9. The adaptor of claim 2, wherein the housing is comprised of two parts arrangeable on opposite sides of the handgrip and interconnectable by a plurality of fasteners.

10. The adaptor of claim 9, wherein each of the fasteners comprises a bolt insertable through a respective bolt receiving bore in a first of the parts and a complementary threaded insert in a second of the parts and wherein when the first part is arranged adjacent the second part, the bore aligns with the insert such that the bolt is threadable into the insert via the bore.

11. The adaptor of claim 2, further comprising an accelerometer for measuring a current angle of the sidestick.

12. A kit for measuring a force feedback of a control interface in a flight simulator or aircraft, the control interface moveable in a back-and-forth direction to change one of a pitch and a yaw of the simulator and in a side-to-side direction to change a roll of the simulator, the kit comprising:
   a force gauge comprising a gauge handle, a gauge attachment portion and a first direction of measurement; and
   a housing positionable adjacent the control interface, the housing comprising a first inner surface configured to snugly receive a predetermined surface of the control interface and a second outer surface comprising a first point of attachment configured for attachment to the gauge attachment portion such that the first direction of measurement is aligned with one of the back-and-forth direction and the side-to-side direction.

13. The kit of claim 12, wherein the handle portion is elongate and at right angles to the first direction of measurement.

14. The kit of claim 12, wherein the gauge comprises a second direction of measurement at right angles to the first direction of measurement, and the first point of attachment is configured for attachment to the gauge attachment portion such that the first direction of measurement is aligned with the back-and-forth direction and the second direction of measurement is aligned with the side-to-side direction.

15. The kit of claim 14, wherein the handle portion is elongate and at right angles to the first direction of measurement and the second direction of measurement.

16. The kit of claim 14, wherein the second direction of measurement is along a gauge axis and the first direction of measurement is about the gauge axis.

17. The kit of claim 12, wherein the control interface comprises a sidestick, wherein the housing is securable about a shaft of the sidestick and wherein the gauge attachment portion comprises an elongate plunger, the first direction of measurement is aligned with a plunger axis, the second outer surface comprises a second point of attachment, and the first point of attachment is configured to receive an end of the plunger such that the plunger axis is aligned with the back-and-forth direction and the second point of attachment is configured for receiving the plunger such that the plunger axis is aligned with the side-to-side direction.

18. A method for testing a force feedback of a control interface in a flight simulator or aircraft, the control interface being moveable in at least one of a back-and-forth direction to change a pitch or a yaw of the simulator and in a side-to-side direction to change a roll of the simulator, the method comprising:
   placing an adaptor comprising a first point of attachment adjacent the control interface;
   connecting a force gauge to the first point of attachment such that a first direction of measurement of the force gauge is aligned with one of the back-and-forth direction and the side-to-side direction; and
   moving a gauge handle portion of the force gauge in the first direction of measurement, thereby causing the force gauge to measure the force feedback generated by the control interface in the first measurement direction.

19. The method of claim 18, further comprising measuring a current angle of the control interface.

20. The method of claim 18, wherein:
   the control interface comprises a sidestick;
   the force gauge comprises a second direction of measurement at right angles to the first direction of measurement; and
   the connecting comprises connecting the force gauge to the first point of attachment such that the first direction of measurement is aligned with the back-and-forth direction and the second measurement direction is aligned with the side-to-side direction.

21. The method of claim 20, wherein the first direction is about the second direction and further wherein measuring the force by the sidestick in the first direction comprises measuring a torque between the elongate handle and the first point of attachment.

22. The method of claim 18, wherein the control interface comprises a sidestick and the adaptor comprises a second point of attachment, the force gauge comprises an elongate plunger, and the attaching comprises one of securing an end of the plunger to the first point of attachment such that a plunger axis aligns with the first direction of measurement and securing the end of the plunger to the second point of attachment such that the plunger axis aligns with a second direction of measurement at right angles to the first direction of measurement.

23. The method of claim 22, further wherein the first direction of measurement is aligned with the back-and-forth direction and the second direction of measurement is aligned with the side-to-side direction.

\* \* \* \* \*